Jan. 30, 1923.
A. CABRINI.
APPARATUS FOR SOWING RICE.
FILED JAN. 27, 1920.
1,443,342
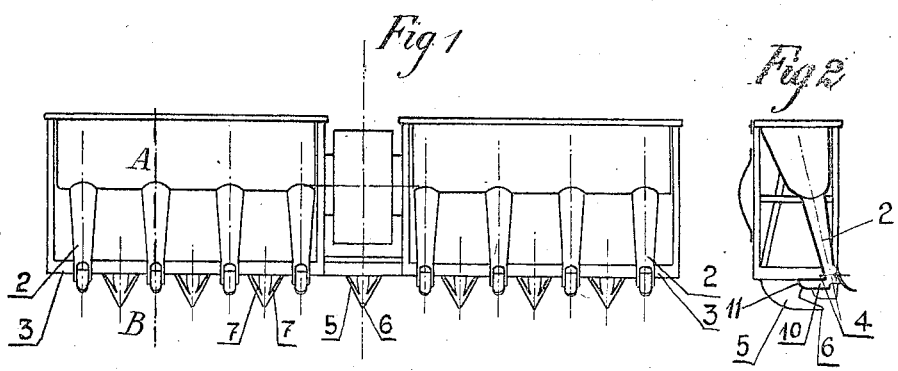
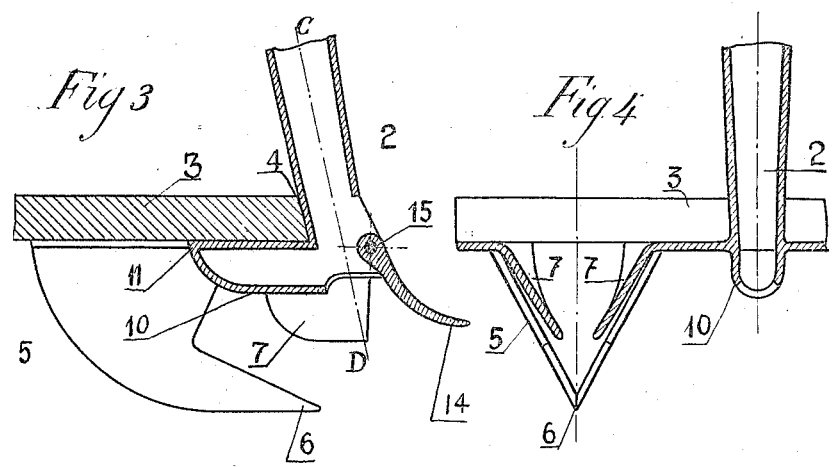
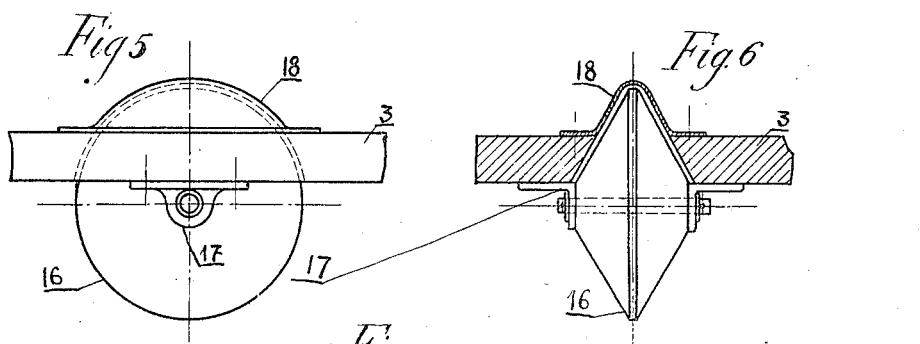
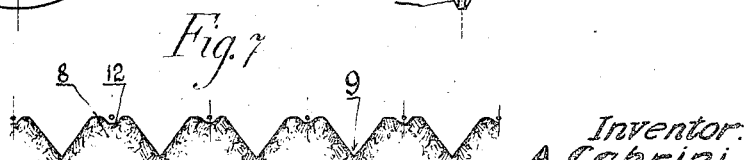
Inventor.
A. Cabrini
By H. R. Kerslake Atty Patented Jan. 30, 1923.

1,443,342

UNITED STATES PATENT OFFICE.

ATTILIO CABRINI, OF MILAN, ITALY.

APPARATUS FOR SOWING RICE.

Application filed January 27, 1920. Serial No. 354,402.

*To whom it may concern:*

Be it known that ATTILIO CABRINI, manufacturer, a subject of the Kingdom of Italy, residing at Milan, Corso Italia 25, Italy, has invented certain new and useful Improvements in Apparatus for Sowing Rice, of which the following is a specification.

The present invention relates to an apparatus for treating the ground and sowing seed in rice-fields.

The process of preparing the ground and sowing seed is carried out by driving along in the fields, a sliding machine provided with wedged skates, said operation resulting in the formation of rows, on the middle line of which small channels are formed to receive the grains of rice-seed, a further sliding member being provided to press said grains into the ground.

An object of the invention is to provide an apparatus, strictly connected with the execution of said process.

The principles of my invention will be better understood with reference to the annexed drawings, of which:

Fig. 1 is an elevational rear view of a seed machine, provided with the apparatus to carry on the invention.

Fig. 2 is a side elevational view of same.

Fig. 3 is a partial section on line A—B of Fig. 1 and shows in larger scale the apparatus which forms the subject of the invention.

Fig. 4 is a section on line C—D of Fig. 3.

Figs. 5 and 6 represent respectively in side view and front view a further form of construction of a detail of the apparatus.

Fig. 7 shows a cross section of the field after it has been treated according to the invention.

According to the invention, the body of an ordinary seeding machine is substantially mounted on a board —3— rectangular in form, to the back edge —4— of which are secured the lower ends of the feed tubes —2— for the seed.

Under the board and precisely on each of the middle lines comprised between two adjacent tubes —2— are mounted the plowing members —5— consisting of a kind of hollow wedge having a cutting edge at its front and shaped on the sides according to the principles adopted in shaping the fore portion of boats and ships.

Said plowing member is provided with a tail —6— which smooths the ground already furrowed by the progress of the machine, while, two wings —7— arranged over the tail 6 and practically parallel to the sides of the plowing member, but a little nearer to the middle line thereof, have the effect of smoothing and packing the sides of the furrows.

The machine being driven along by aninal power, the ground will be furrowed at —9— as shown in section in Fig. 7 and the small dykes —8— are formed between the furrows.

Under the board —3— correspondent with the cross lines passing through the lower ends of the tubes —2— is mounted a skate —10— which consists of an half cylinder with a tapered front end at —11—.

Said skate is higher than skate —5— and forms a small channel —12— in the soil wherein fall the grains, which are pressed against the wet ground, by a kind of a tongue —14— pivotally or elastically mounted at —15— on the lower end of each tube —2—.

In lieu of the sliding plow member —5—, rotary members may be provided, consisting of bevelled wheels —16—, mounted on bearings —17— and provided with guards —18—.

Having now particularly described the nature of my invention and the manner in which the same should be performed, I claim:—

An apparatus for sowing rice comprising a base board provided on its upper side with seed hoppers, seed feeding tubes extending downwardly from said hoppers and provided at their lower ends with semi-cylindrical soil engaging elements provided with tapered front ends, designed to form slight depressions in the surface of the soil, plowing elements extending from the under side of said board, and each arranged between two of the seed feeding tubes, each of said plowing elements consisting of a wedge-shaped element having a curved forward cutting edge designed to cut the soil and form furrows between the spaces occupied by said semi-cylindrical members, converging soil packing members located rearwardly of each of said wedge-shaped elements, and a tongue provided at the rear of each of said seed feeding tubes for forcing seeds dropped by the tubes into the depressions formed by said semi-cylindrical members.

In testimony whereof I affixed signature.

CABRINI, ATTILIO.